July 31, 1956 J. L. HOWE 2,756,965
RECOVERY OF WEIGHTING MATERIAL FROM A DRILLING FLUID
Filed Dec. 22, 1952

INVENTOR.
JACK L. HOWE
BY Hudson and Young
ATTORNEYS

United States Patent Office 2,756,965
Patented July 31, 1956

2,756,965
RECOVERY OF WEIGHTING MATERIAL FROM A DRILLING FLUID

Jack L. Howe, Houston, Tex., assignor to Phillips Petroleum Company, a corporation of Delaware Application December 22, 1952, Serial No. 327,364

8 Claims. (Cl. 255—1.8)

This invention relates to a method and apparatus for separating and recovering weighting material from a drilling fluid. In one aspect it relates to the separation and recovery of weighting material from a water base drilling fluid. In another aspect it relates to a method and apparatus for maintaining a substantially constant weight in a drilling fluid used in drilling a well.

In the art of drilling wells, especially drilling by the rotary method, it is necessary to use a drilling fluid, as is well understood in the art. The drilling fluid lubricates the drill stem, carries the cuttings to the surface of the well, and forms a filter cake on the walls of the well preventing loss of at least any substantial amount of water from the drilling fluid to the natural formations in the well. The weight of the fluid prevents blowouts of formation pressures especially when weighting agents are employed. In order to perform these important functions properly the drilling fluid must have suitable viscosity and other qualities at all times in spite of adverse conditions encountered in drilling the well. Thixotropic properties of the fluid support the cuttings during any time the pumps are shut down.

During the drilling operation as the bit progresses downwardly through the earthen formations additional clayey material is ground up and dispersed within the drilling fluid system thereby adding bulk to the body of drilling fluid. When a weighted drilling fluid is employed, the increase in volume of the drilling fluid body caused by the additional materials, resulting from the action of the bit, results in a corresponding decrease in the weight or density of the drilling fluid. Thus as more clay material invades the drilling fluid and additional water is added to maintain the viscosity of the drilling fluid at the desired low level, additional weighting material must be introduced in order to maintain the density of the fluid at the desired level. The volume of drilling fluid quite frequently increases at a greater rate than the demand caused by the additional volume resulting from deepening the bore hole. It is therefore frequently necessary to discard drilling fluid in order to keep the volume of the drilling fluid within reasonable bounds. Thus it is apparent that more weighting material is used in drilling an oil well than is actually necessary because of the great amount discarded due to the increase in volume of the drilling fluid as the drilling progresses.

When an oil well has been completed wherein a weighted drilling fluid has been used the drilling fluid is discarded, usually by being buried in a nearby pit or exposed to the atmosphere in shallow pits and allowed to dry. The weighting material used in drilling an oil well represents a substantial portion of the cost of the drilling fluid. Thus a practical method for recovering the weighting material from a weighted drilling fluid would afford a great economy in the drilling of oil wells.

Barium sulfate, commonly called barytes, is commonly used as weighting material in drilling fluids, particularly water base drilling fluids, although barium sulfate is also used in emulsion type, and in oil base drilling fluids. Other materials which are used include iron oxide and other insoluble, heavy metal salts.

The aspects of this invention will be attained by the following objects.

It is an object of this invention to provide a method and apparatus for separating and recovering weighting materials from drilling fluids.

It is another object to provide a method for maintaining the density of a weighted drilling fluid while drilling a well.

It is another object to separate and recover barium sulfate from a water base drilling fluid.

Other objects will be apparent to one skilled in the art upon reading this specification and the appended drawing.

I have discovered a method for separating and recovering weighting material from a drilling fluid which comprises contacting said fluid with a diluent in a mixing zone, removing excess colloidal material in the form of diluted drilling fluid from the top of this zone and recovering the separated weighting material from the bottom of the zone.

I have devised an apparatus for carrying the method of my invention into practice. The apparatus and the method can be readily understood by reference to the attached drawing and the following description of the invention.

Figure 1:
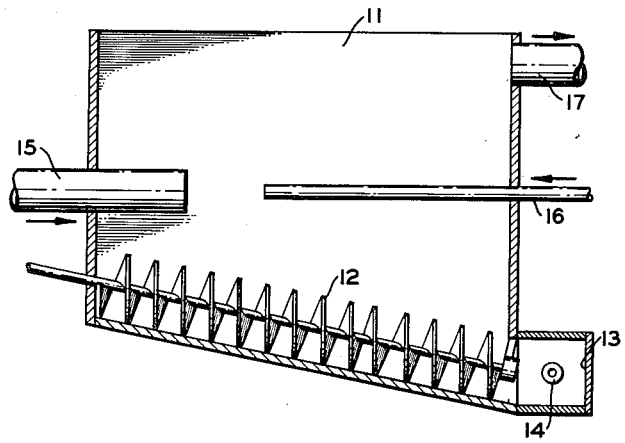
Figure 1 is a side view, in section, of one modification of the device of the invention.

In the drawing, the apparatus of Figure 1 is shown as an elongated V-shaped container 11, having a sloped and rounded bottom containing a screw conveyor 12. The screw conveyor empties into a conduit 13, having therein a jet nozzle 14. A drilling fluid inlet 15 enters the container at the end opposite conduit 13. A fresh water inlet 16 is disposed opposite drilling fluid inlet 15 so as to disperse the drilling fluid upon entry to the container. An overflow conduit 17 is located at the top of container 11 to dispose of drilling fluid freed of weighting material.

Figure 2:
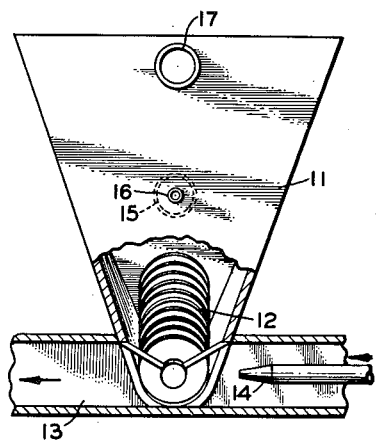
Figure 2 is a front view, in section.

Figure 2 shows the jet nozzle 14 disposed in conduit 13 so as to remove recovered weighting material to the drilling fluid system or to storage.

Figure 3:
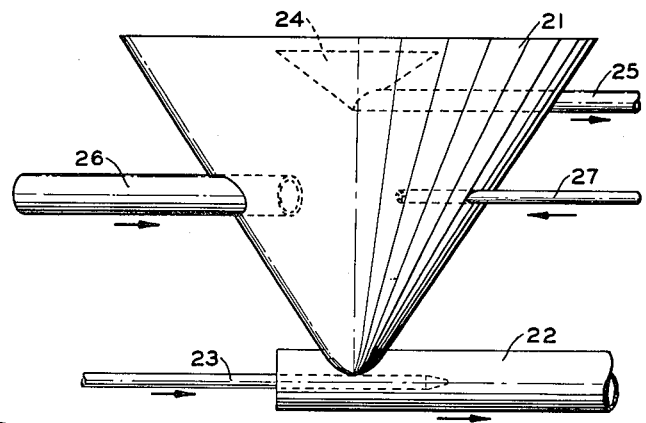
Figure 3 is an elevation, in section, of another modification of the device of the invention.

In Figure 3 is shown a modification wherein the apparatus is shown as a container 21 in the shape of an inverted cone-shaped structure whose truncated apex is connected to a conduit 22 containing a jet nozzle 23. An overflow device 24 is located in the top of container 21 connected to conduit 25. Drilling fluid inlet 26 admits drilling fluid tangentially to container 21. Fresh water inlet 27 admits water tangentially to container 21 countercurrent to the flow of drilling fluid from inlet 26.

Figure 4:
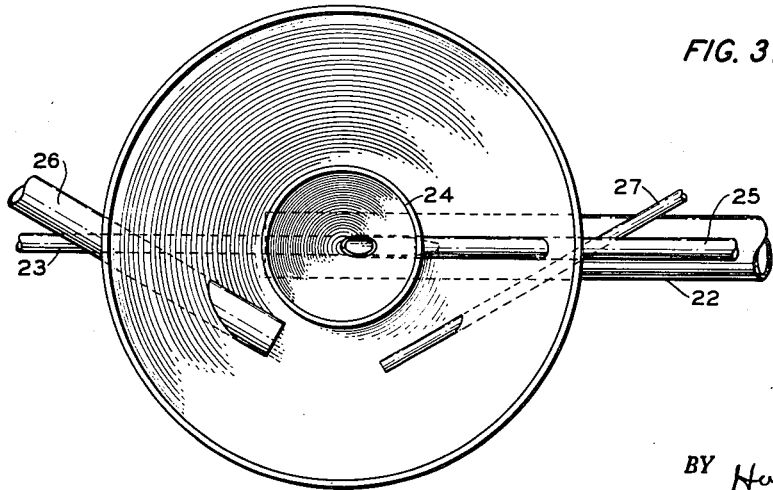
Figure 4 is a plan view, in section, of the device of Figure 3.

The tangential arrangement of pipes 26 and 27 is shown in Figure 4.

In the operation of the modification of the invention as shown in Figures 1 and 2, the drilling fluid is admitted to the apparatus through pipe 15 and fresh water is admitted through pipe 16 under sufficient pressure to disperse and break up the stream of drilling fluid and in sufficient volume to dilute the fluid and release the weighting material from the suspending action of the colloidal material in the drilling fluid. The lighter, diluted colloidal material rises to the top of container 11 and is carried away by the overflow conduit 17. The heavy weighting material released from the suspending influence of the colloidal material by dilution and agitation occasioned by the stream of water and then followed by the time and space for separation, settles to the bottom of the container. The weighting material upon settling to the bottom of the container is conveyed by screw conveyor 12 into conduit 13 where it is then conveyed, as a slurry, by the action of water from jet nozzle 14 through conduit 13 to the drilling fluid system or to storage.

The water used in jet nozzle 14, in addition to conveying the weighting material from the recovery process to the drilling fluid system or to storage, acts to remove any soluble impurities which may be present in the weighting material.

In the modification shown in Figures 3 and 4, the drilling fluid is admitted to the container tangentially and the water is admitted tangentially and countercurrent to the flow of drilling fluid. The flow of water is usually greater than that of the drilling fluid so that the drilling fluid and water move around the container in the direction of the flow of water. In some cases the flow may be reversed. The ratio of the flow of water to that of the drilling fluid will determine the direction of the flow around the container. In any event the weighting material will tend to move to, and downwardly along, the sloping sides of the container and the lighter colloidal material will be moved to the over-flow in the center of the top of the container.

The separated weighting material is removed from the bottom similarly to the method of that of Figures 1 and 2.

In either modification of the apparatus, the sloping sides are advantageously at an angle to horizontal greater than the angle of repose of the weighting material so that the weighting material which settles out from the drilling fluid will not pile upon the sides but will proceed downwardly to the bottom of the vessel.

The body of fluid is maintained in a state of gentle agitation conducive to separating the fine particles of weighting material from the supporting fluid. This gentle motion of the body of fluid is sufficient to prevent an accumulation of weighting material upon the sides of the vessel.

Although the description of my invention has been directed to removal of weighting material from a water base drilling fluid, it is equally applicable to the removal of weighting material from an emulsion-type or from an oil-base drilling fluid. The diluting liquid in the case of an oil-base drilling fluid will be oil and the diluting liquid in the case of an emulsion-type drilling fluid will be the liquid which forms the continuous phase, which is usually water.

Variations and modifications are possible within the scope of the disclosure of the present invention the essence of which is that a method and apparatus has been devised for removing and recovering weighting material from a drilling fluid.

I claim:

1. An apparatus for separating and recovering weighting material from a drilling fluid which comprises a vessel for maintaining a body of said fluid, having sides which converge inwardly and downwardly to the bottom; a drilling fluid inlet positioned intermediate the top and bottom of said vessel; a diluent inlet positioned on a common level with said drilling mud inlet and positioned so as to direct flow of diluent countercurrent to the flow of said drilling fluid; means for removing separated weighting material from the bottom of the vessel; and means for removing and discarding diluted colloidal material at the top of the vessel.

2. A method for separating and recovering weighting material from a drilling fluid containing a colloidal material which comprises contacting said fluid with a diluent beneath the surface of a body of said fluid in a separation zone in an amount sufficient to release said weighting material from the suspending action of said colloidal material; agitating the resulting diluted fluid; removing and discarding diluted drilling fluid from the top of said zone; and recovering separated weighting material from the bottom of said zone.

3. The method of separating weighting material from a drilling fluid containing same in a suspended state dispersed by a colloidal material which comprises maintaining a body of said fluid in a separation zone; introducing a stream of said drilling fluid into and beneath the surface of the fluid contained in said separation zone; introducing a stream of diluting liquid beneath the surface of said body of fluid and into counter-current contact with said stream of drilling fluid in an amount sufficient to release the weighting material from the suspending action of said colloidal material and at a velocity sufficient to agitate the resulting diluted drilling fluid in said separation zone; removing and discarding diluted drilling mud freed of weighting material from the top of said separation zone; and removing weighting material from the bottom of said zone.

4. In the process of drilling a well with well drilling tools wherein there is circulated, within the well, a drilling fluid which contains a weighting material suspended by a colloidal material the improvement which comprises introducing a stream comprising a portion of said drilling fluid into and beneath the surface of a fluid contained in a separation zone; introducing a stream of diluting liquid beneath the surface of said fluid in said separation zone into counter-current contact with said stream of drilling fluid at a velocity sufficient to disperse said drilling fluid and to maintain the resulting diluted fluid in a state of agitation and in an amount sufficient to release said weighting material from the suspending action of the colloidal material contained in said drilling fluid; removing and discarding diluted drilling fluid freed of weighting material from the top of said zone; removing weighting material separated from said drilling fluid from the bottom of said zone; and introducing said weighting material into the remaining drilling fluid.

5. An apparatus for separating and recovering weighting material from a drilling fluid which comprises a generally horizontal elongated vessel having a generally rectangular top, substantially vertical end sections, and side sections which gradually converge to a rounded bottom section; a screw conveyor disposed within said rounded bottom section; a conduit connected to the bottom of said vessel and communicating with said screw conveyor; a pipe extending into said conduit and terminating in a nozzle in said conduit so as to direct fluid through said conduit; an inlet intermediate the top and bottom of said vessel for admitting drilling fluid into said vessel; an inlet for admitting diluent into said vessel adjacent and counter-current to the flow of drilling fluid said diluent inlet being on a longitudinal axis substantially common to that of said drilling fluid inlet; and an overflow outlet at the top of said vessel.

6. An apparatus for separating and recovering weighting material from a drilling fluid which comprises a vertical circular vessel having sides extending inwardly and downwardly to a base; a conduit connected to and communicating with said base; a tangential drilling fluid inlet intermediate the top and bottom of said vessel; a tangential diluent liquid inlet positioned on a common level with said drilling fluid inlet in said vessel arranged so as to produce flow counter-current to that of said drilling fluid; an overflow outlet disposed in the center of the top of said vessel; and a pipe extending into said conduit and terminating in a nozzle in said conduit so as to direct fluid through said conduit.

7. In the process of drilling a well with well drilling tools wherein there is circulated, within the well, a drilling fluid containing weighting material suspended by colloidal material and wherein clayey material is added to the fluid system by the action of the drill upon earthen formations the method of maintaining the density of the drilling fluid which comprises introducing a stream of drilling fluid representing the amount of excess clayey material into and beneath the surface of the fluid contained in a separation zone; introducing a diluent liquid beneath the surface of the fluid in said zone in countercurrent flow relationship to said drilling fluid in an amount sufficient to release said weighting material from the suspending action of said colloidal material and under sufficient pressure so as to disperse said drilling fluid and to cause a gentle agitation of said body of fluid; removing and discarding diluted clayey material freed from weighting material from the top of said zone; and removing separated weighting material from the bottom of said zone and returning said weighting material to said circulating drilling fluid.

8. A method for recovering weighting material from a drilling fluid containing a colloidal material which comprises countercurrently contacting said fluid with a sufficient amount of a diluent so as to release the weighting material from the suspending action of said colloidal material and at a velocity sufficient to disperse said fluid and to maintain a resulting diluted fluid in a state of agitation; removing and discarding diluted drilling fluid; and recovering weighting material.

References Cited in the file of this patent

UNITED STATES PATENTS

| | | |
|---|---|---|
| 1,647,310 | Richardson | Nov. 1, 1927 |
| 1,833,390 | Carter | Nov. 24, 1931 |
| 1,842,372 | Allison | Jan. 26, 1932 |
| 1,908,102 | Arledter | May 9, 1933 |
| 1,922,489 | Mercier | Aug. 15, 1933 |
| 1,937,190 | Chance | Nov. 28, 1933 |
| 2,078,752 | Christensen | Apr. 27, 1937 |
| 2,276,075 | Wuensch | Mar. 10, 1942 |

FOREIGN PATENTS

| | | |
|---|---|---|
| 29,074 | Netherlands | Mar. 15, 1933 |
| 651,094 | Great Britain | Mar. 14, 1951 |